(12) United States Patent
Tian et al.

(10) Patent No.: US 10,822,881 B2
(45) Date of Patent: Nov. 3, 2020

(54) SPLIT ROLLER CONE AND PDC COMPOSITE DRILL BIT

(71) Applicant: Southwest Petroleum University, Chengdu (CN)

(72) Inventors: Jialin Tian, Chengdu (CN); Yinglin Yang, Chengdu (CN); Hongzhi He, Chengdu (CN); Lin Yang, Chengdu (CN); Jie Xiong, Chengdu (CN); Yi Zhou, Chengdu (CN); Siqi Zhou, Chengdu (CN); Genyin Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 16/419,019

(22) Filed: May 22, 2019

(65) Prior Publication Data
US 2019/0360274 A1 Nov. 28, 2019

(30) Foreign Application Priority Data
May 22, 2018 (CN) .......................... 2018 1 0495882

(51) Int. Cl.
| | |
|---|---|
| E21B 10/43 | (2006.01) |
| E21B 10/14 | (2006.01) |
| E21B 10/50 | (2006.01) |
| E21B 10/55 | (2006.01) |
| E21B 10/567 | (2006.01) |

(52) U.S. Cl.
CPC .............. *E21B 10/14* (2013.01); *E21B 10/43* (2013.01); *E21B 10/50* (2013.01); *E21B 10/55* (2013.01); *E21B 10/567* (2013.01)

(58) Field of Classification Search
CPC .......... E21B 10/14; E21B 10/16; E21B 10/20; E21B 10/43; E21B 10/50; E21B 10/55; E21B 10/567; E21B 10/62; E21B 10/627
See application file for complete search history.

(56) References Cited

U.S. PATENT DOCUMENTS

| | | | |
|---|---|---|---|
| 6,209,420 B1 * | 4/2001 | Butcher | ................ B22F 3/1055 76/108.2 |
| 2016/0230468 A1 * | 8/2016 | Ricks | ....................... E21B 10/20 |
| 2017/0122036 A1 * | 5/2017 | Kulkarni | ................. E21B 10/22 |
| 2018/0298696 A1 * | 10/2018 | Barry | ....................... E21B 10/24 |

* cited by examiner

*Primary Examiner* — David Carroll
(74) *Attorney, Agent, or Firm* — Bayramoglu Law Offices LLC

(57) ABSTRACT

A split roller cone and polycrystalline diamond compact (PDC) composite drill bit, including a PDC bit module, a split roller cone bit module, and a drill bit body module. The split roller cone bit module has split structure, and during the operation, the lower roller cone body and the upper roller cone body revolve with the drill bit, and rotate around the axle neck of the palm respectively, thereby achieving the task of scraping and breaking rocks. The tooth scraping efficiencies of the small-end ring gear and the middle ring gear are improved. The split roller cone bit module, the PDC bit module, and the drill bit body module can be mass-produced. The split roller cone bit module and the PDC bit module can be quickly assembled and disassembled with the drill bit body module and different sizes of PDC bit modules are assembled with the bit body module.

5 Claims, 12 Drawing Sheets

SPLIT ROLLER CONE AND PDC COMPOSITE DRILL BIT

CROSS REFERENCE TO THE RELATED APPLICATIONS

This application is based upon and claims priority to Chinese Patent Application No. 201810495882.1, filed on 22 May 2018, the entire contents of which are incorporated herein by reference.

TECHNICAL FIELD

The present invention relates to a split roller cone and polycrystalline diamond compact (PDC) composite drill bit for oil and gas drilling.

BACKGROUND

A PDC fixed cutter blade of the PDC and roller cone composite drill bit rotates with the drill bit driven by a torque. The roller cone cutting structure rotates with the bit body around the bit axis and moves downward, and at the same time, the roller cone rotates around its own axis. The cutting sections of the roller cone cutting structure and the PDC fixed cutter blade cutting structure overlap with each other at the axes and the nose and shoulder regions of the periphery (conventional PDC bits are highly susceptible to wear in the nose and shoulder regions). The roller cone cutting structure in the nose and shoulder regions of limited height crushes and breaks the geological formation in advance or partially. Therefore, the cooperation of the roller cone cutting structure and the PDC fixed cutter blade cutting structure allows the composite drill bit to combine the advantages of both the conventional roller cone bit and the PDC bit. Therefore, the PDC and roller cone composite drill bit can effectively achieve complementary advantages of the conventional roller cone bit and the PDC bit, and enhance the adaptability of the drill bit for harsh geographical formations having characteristics such as high strength, high abrasiveness and heterogeneity.

Generally, a ring gear near a bottom of the roller cone is called a roller cone big-end ring gear, which is referred to as a big-end ring gear, and a part near a top of the roller cone is called a roller cone small-end ring gear, which is referred to as a small-end ring gear. At present, for most of the PDC and roller cone composite drill bits used in actual production, only one roller cone body is mounted on the palm of the roller cone bit. Namely, the roller cone body has only one rotation speed when rotating around the axle neck of the palm, which results in a certain regularity of tooth scraping efficiency from the small-end ring gear to the big-end ring gear. The small-end ring gear has the lowest tooth scraping efficiency, the big-end ring gear has the highest tooth scraping efficiency, and the middle ring gear has a tooth scraping efficiency between the lowest and the highest tooth scraping efficiencies, which impacts the rock breaking efficiency of the PDC and roller cone composite drill bit.

At present, the PDC bits used in the oil and gas drilling field are mainly divided into two types: a steel body type and a carcass type. The main material of the carcass type PDC bit is casting tungsten carbide powder, which is expensive and not environmentally friendly. While the material of the steel body type PDC bit main body is steel, having low price and high strength, thereby reducing the use of heavy metal and facilitating the environmental protection. With the development of CNC technology and the continuous improvement of the processing technology, the cost of the steel body type PDC bit is lower than that of the carcass type PDC bit, and the performance of the steel body type PDC bit is not obviously different from that of the carcass type PDC bit. The steel body type PDC bits are increasingly favored by users, and have been widely popularized and used for drilling. For the existing PDC and roller cone composite drill bit, the PDC fixed cutter blade is generally integrated with the drill bit main body by a milling process. The processing for the drill bit requires a long period and a large amount of workload, which may cause unnecessary resource waste.

Therefore, there is an urgent need in the prior art for a split roller cone and PDC composite drill bit which has increased production and improved efficiency capabilities, and is suitable for large scale production.

SUMMARY

In view of the deficiencies existing in the above-mentioned prior art, the technical problems to be solved by the present invention is to provide a split roller cone and PDC composite drill bit capable of increasing production with improved efficiency, enhancing rock breaking efficiency, and suitable for large production.

The technical solution of the present invention is as follows. A split roller cone and PDC composite drill bit includes a PDC bit module, a split roller cone bit module, and a drill bit body module. The PDC bit module includes a PDC tooth, and a cutter blade. The PDC tooth is arranged on a tooth arranging surface of the cutter blade, and the cutter blade is provided with a second countersunk hole, a second T-slot, and a third T-slot. The split roller cone bit module includes a tooth, a lower roller cone body, an upper roller cone body, a first steel ball, a first rectangular seal, a first plug pin, a palm, an oil storage compensation pressure balance system, a positioning sleeve, a second rectangular seal, a second steel ball, a second plug, wherein the palm is provided with a first countersunk hole, a first T-slot, a first palm axle neck oil guiding hole, a first plug pin hole, a palm oil guiding hole, an oil injection hole, a second palm axle neck oil guiding hole; wherein the upper roller cone body is provided with a second plug pin hole, and the teeth are mounted on the lower roller cone body and the upper roller cone body; wherein the oil storage compensation pressure balance system is installed at a lower end of a back of the palm. When installing the split roller cone bit module, firstly, the rectangular sealing ring a is installed at a bottom inner ring of the lower roller cone body, the second rectangular sealing ring and the positioning sleeve are sequentially installed on a top inner ring of the lower roller cone body, and the second rectangular sealing ring is mounted on a bottom inner ring of the upper roller cone body; secondly, the lower roller cone body and the upper roller cone body are sequentially inserted into the axle neck of the palm, the first steel ball is placed in the first plug pin hole, and the second steel ball b is placed in the second plug pin hole; finally, the first plug pin is installed in the first plug pin hole, the second plug pin is installed in the second plug pin hole, the lubricating oil is added through the oil injection hole, and the oil injection hole is closed by the wire plug. The drill bit body module includes a nozzle, a composite drill bit main body, a cutter blade chuck, and a reinforcing sleeve, wherein the composite drill bit main body is provided with a first threaded hole, a cutter blade chuck mounting hole, a second T-shaped table, a reinforcing sleeve mounting step, a third T-shaped table, a mud outlet; wherein the second T-shaped table is provided with a second threaded hole, and the third T-shaped table is provided with a third threaded hole, the cutter blade chuck is provided with a triangular base and a first T-shaped table, the reinforcing sleeve is provided with a third countersunk hole, the nozzle is mounted on the mud outlet, the cutter blade chuck is mounted in the cutter blade chuck mounting hole, and the second plug is installed in the first threaded hole. When assembling the split roller cone and PDC composite drill bit, firstly, the first T-slot is installed into the second T-shaped table, and the second T-slot is installed into the third T-shaped table, so as to realize the circumferential positioning of the split roller cone bit module and the PDC bit module; secondly, the palm and the cutter blade are fixed on the composite drill bit main body by using a first hexagon socket head bolt and a second hexagon socket head bolt, respectively, so as to realize the axial positioning of the split roller cone bit module and the PDC bit module; finally a first plug and a third plug are inserted into the first countersunk hole and the second countersunk hole, respectively.

In the above solution, the first plug pin is in a interference fit with the first plug pin hole, the second plug pin is also in an interference fit with the second plug pin hole. The first palm axle neck oil guiding hole, the first plug pin hole, the palm oil guiding hole, the oil injection hole, the second palm axle neck oil guiding hole, and a palm axle neck channel form an oil guiding passage, thus forming a good lubrication environment.

The palm axle neck, and the reinforcing sleeve of the above solution are subjected to a strengthening treatment, and have high strength and good impact toughness.

The rectangular sealing ring a and the second rectangular sealing ring in the above solution are both metal sealing rings, and the surfaces of the sealing rings are strengthened, and the wear resistance of the sealing ring is good.

The cutter blade and the composite drill bit main body in the above solution are both steel bodies, and the cutter blade is made of a material with a higher strength than that of a material of the composite bit body.

For the split roller cone and PDC composite drill bit, the cutter blade of different specifications and the cutter blade chuck of different specifications can be simultaneously replaced to change the working outer diameter of the drill bit. Moreover, the reinforcing sleeve is sleeved on the reinforcing sleeve mounting step on the composite drill bit main body and fixed on the composite drill bit main body by screws, and the third countersunk hole is blocked by the plug, thereby improving the force state of the cutter blade.

The advantages of the present invention are as follows: (1) the split roller cone bit module of the split roller cone and PDC composite drill bit has a split structure, and during the drilling process, the upper roller cone body and the lower roller cone body will rotate around respective palm axle neck, thereby the tooth scraping efficiencies of the small-end ring gear and the middle ring gear are improved, which helps to increase speed and efficiency; (2) the split roller cone bit module, PDC bit module, and drill bit body module can be mass-produced as standard parts of the drill bit, thereby the drill bit has a short production cycle and a low manufacturing cost; (3) the split roller cone bit module and the PDC bit module can be quickly assembled and disassembled with the drill bit body module, and different sizes of PDC bit modules and drill bit body module can be respectively assembled to achieve different well sizes.

Figure 1:
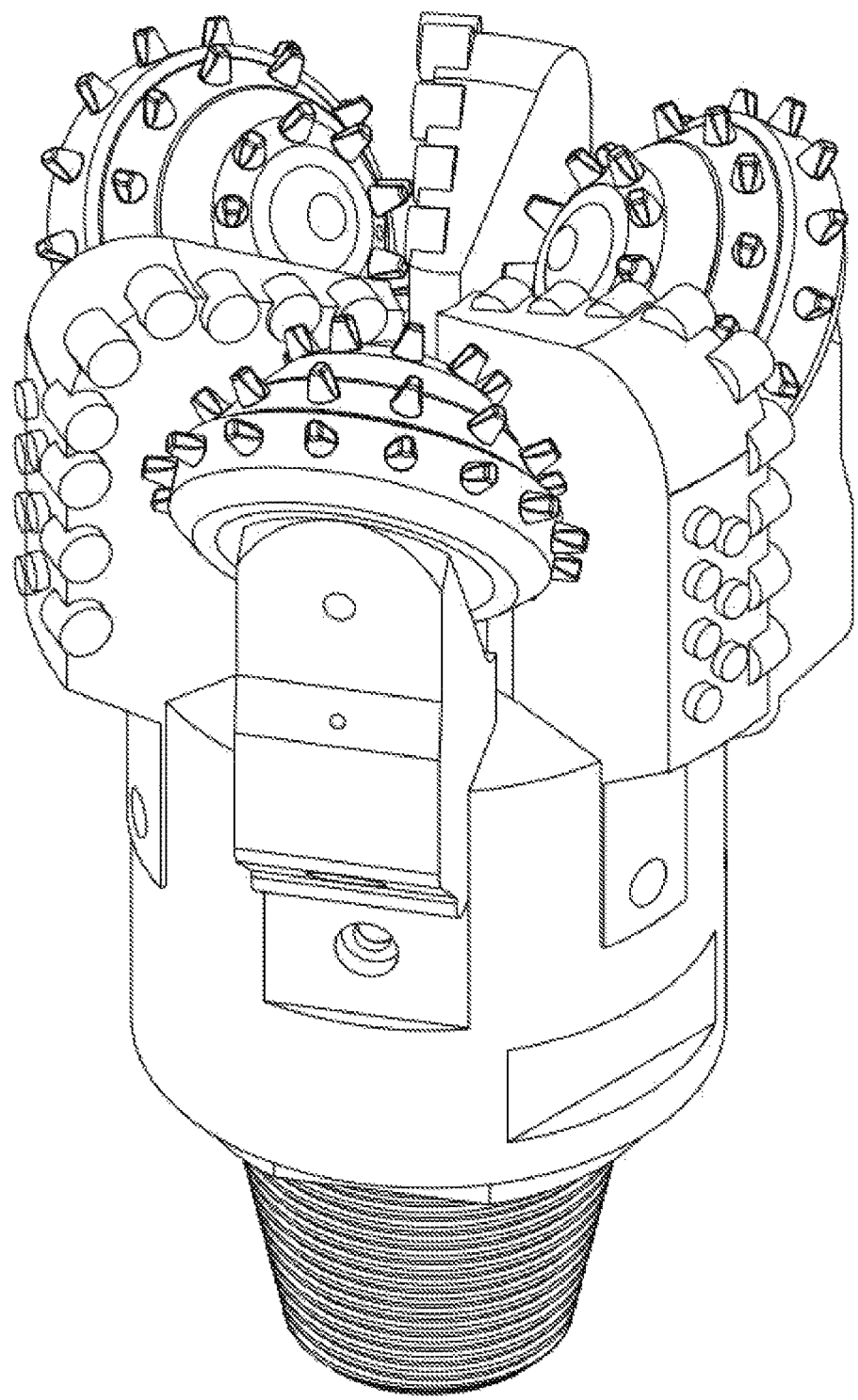
FIG. 1 is a structural diagram of the present invention.
Figure 2:
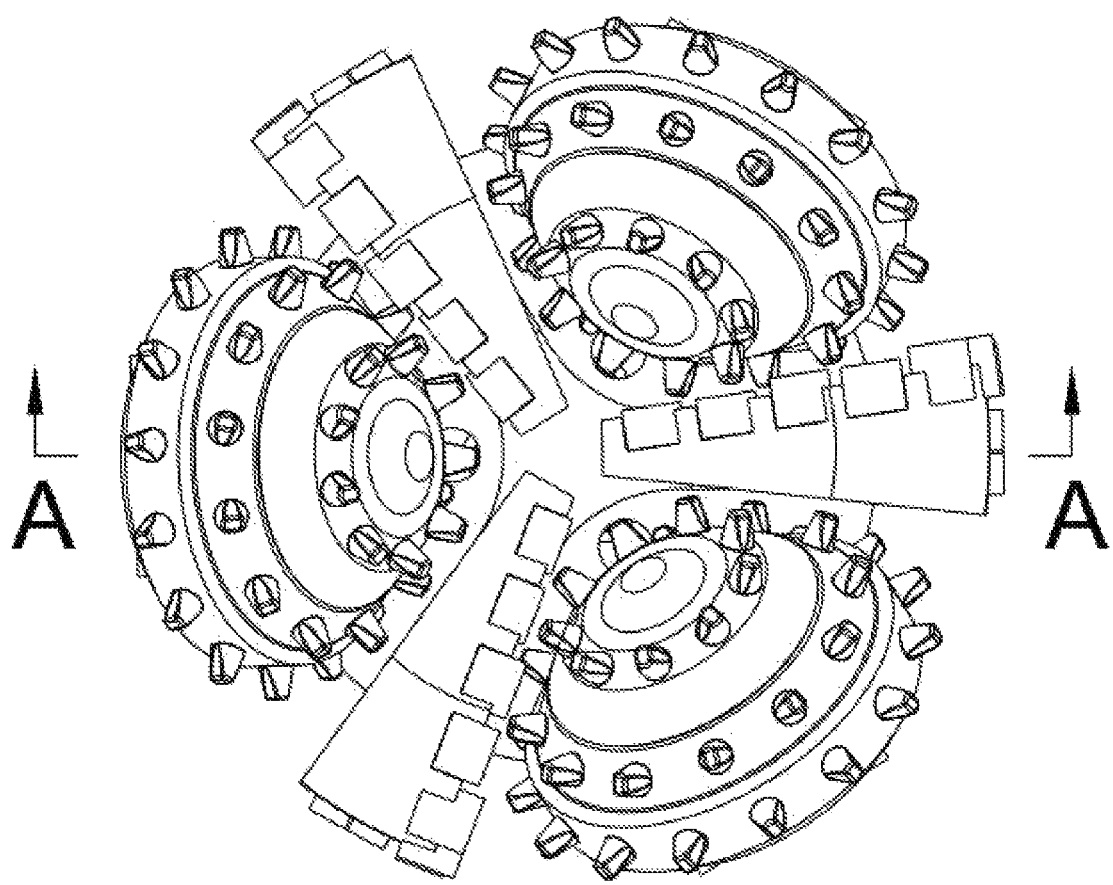
FIG. 2 is a top view of the present invention.
Figure 3:
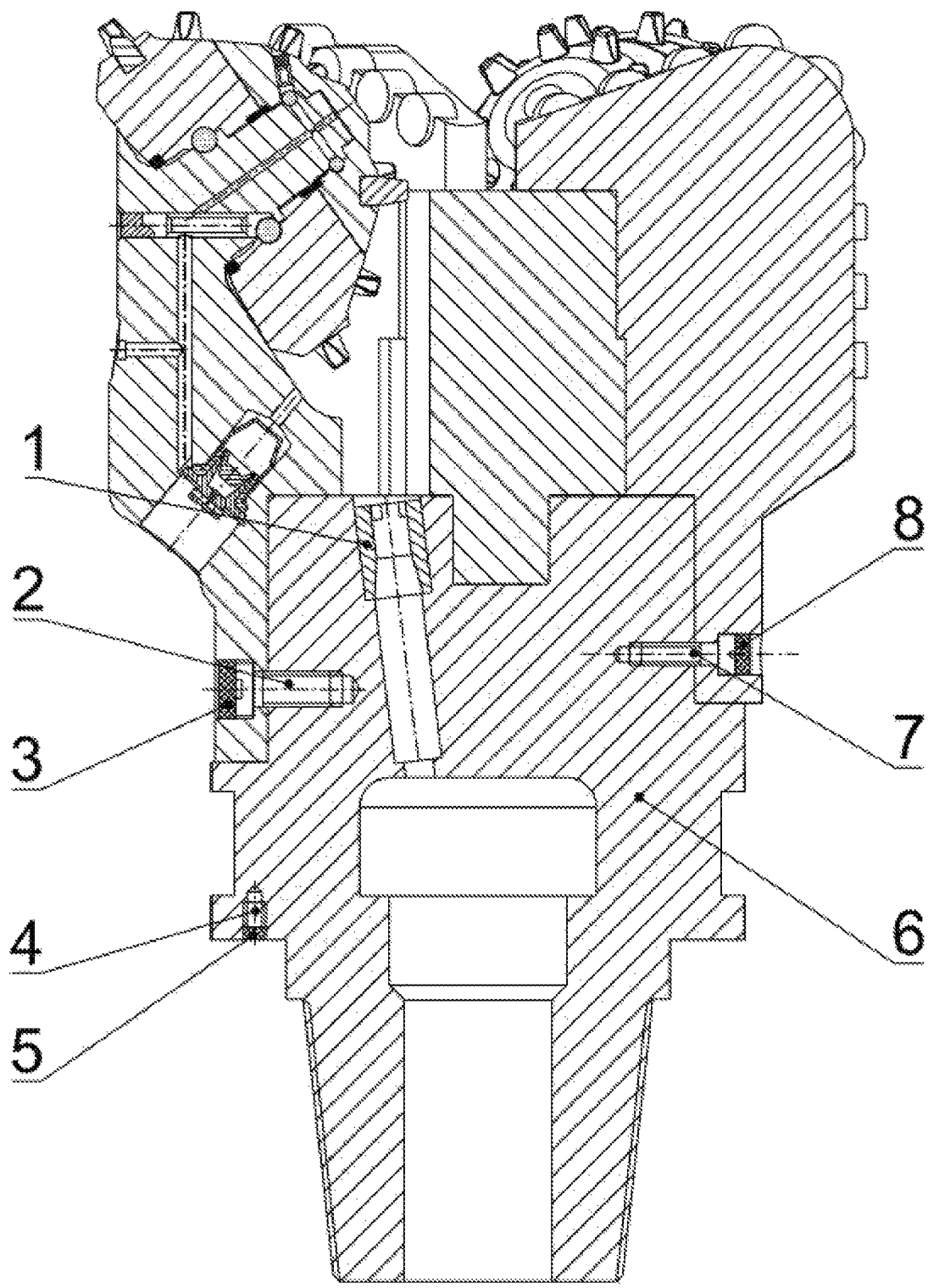
FIG. 3 is a cross-sectional view of FIG. 2 of the present invention in an A-A direction.
Figure 4:
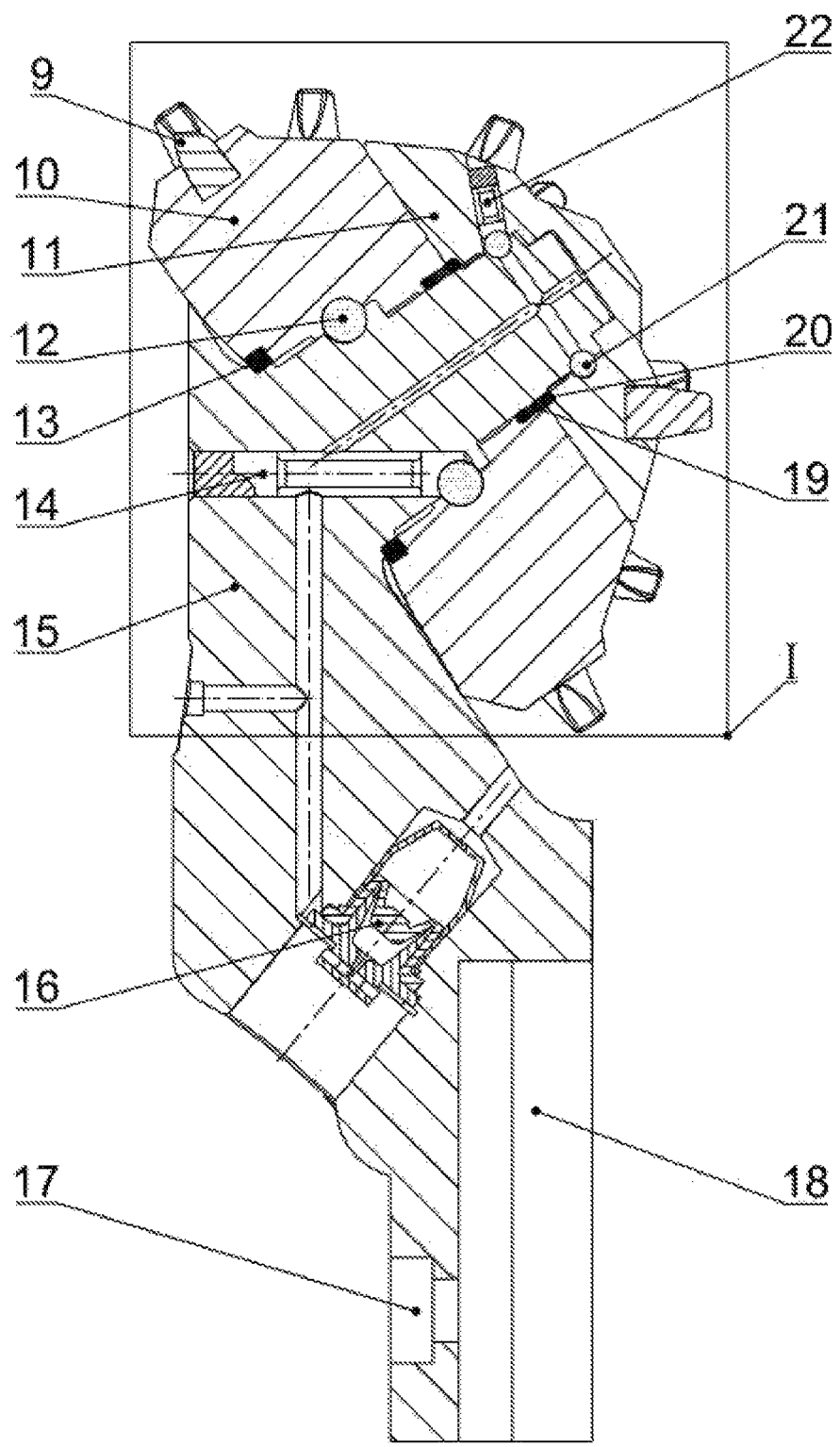
FIG. 4 is a structural diagram showing a split roller cone module of the present invention.
Figure 5:
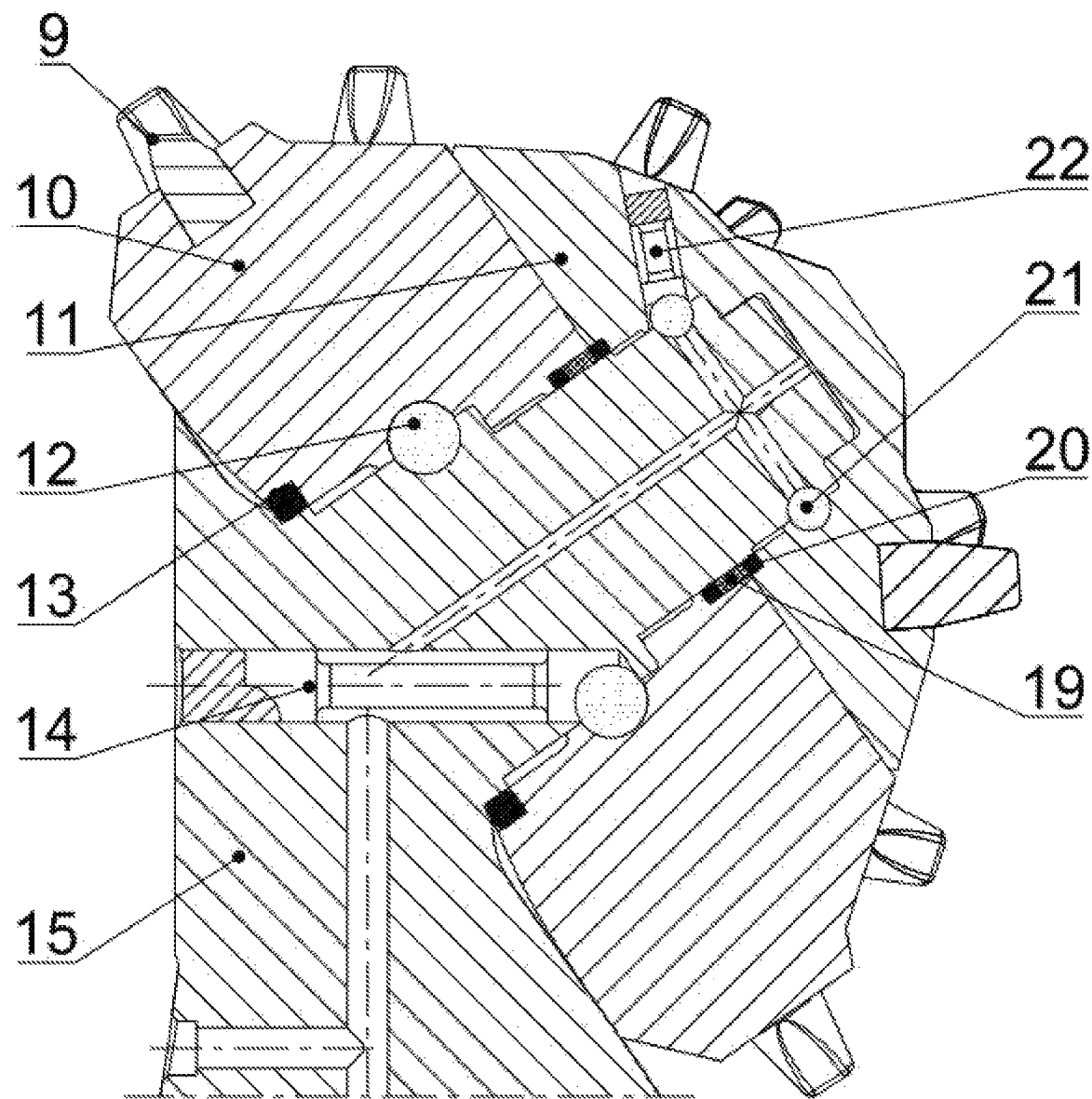
FIG. 5 is an enlarged view showing the portion I of FIG. 4 of the present invention.
Figure 6:
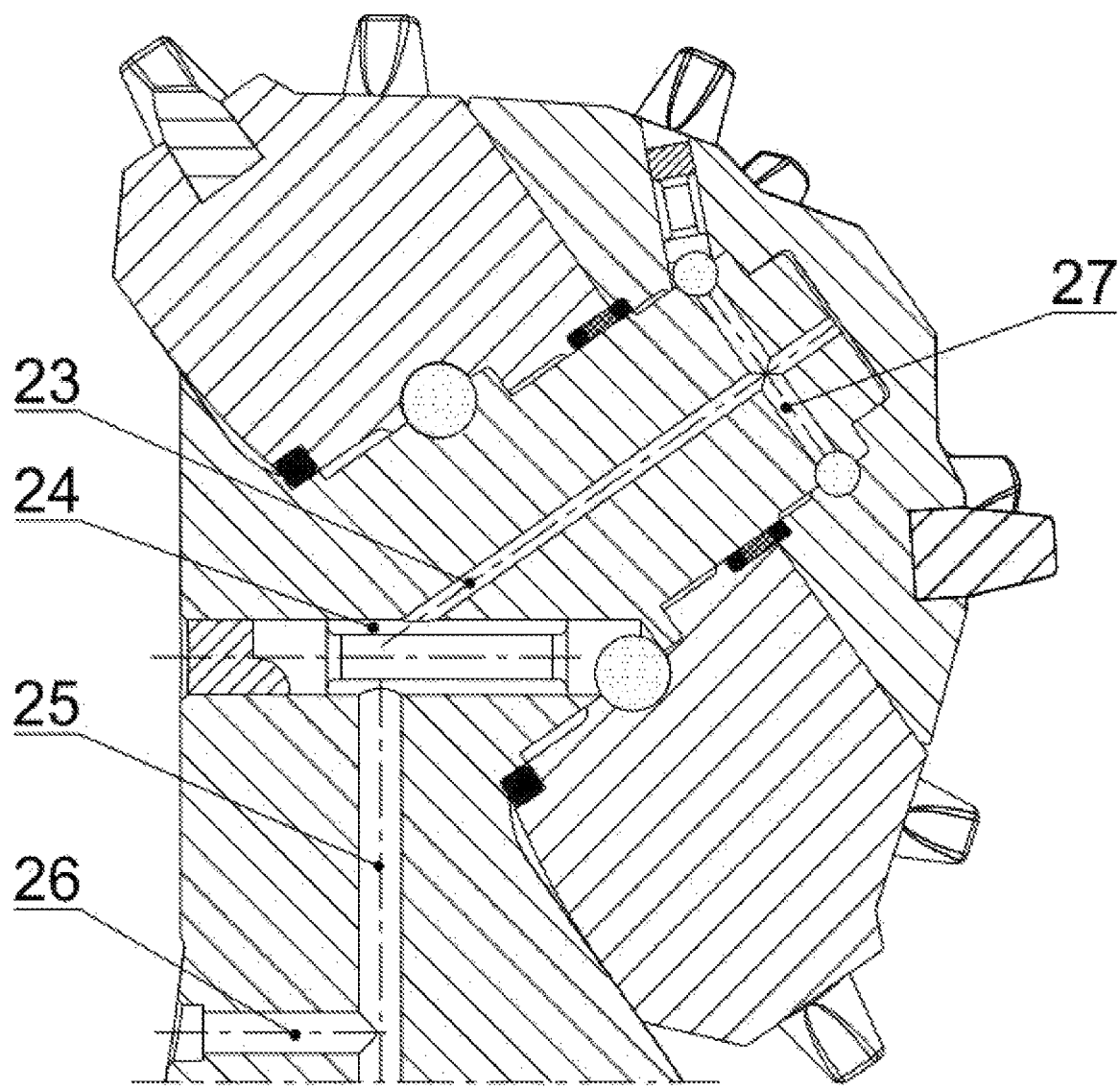
FIG. 6 is a schematic view of an oil guiding passage of a split roller cone module of the present invention.
Figure 7:
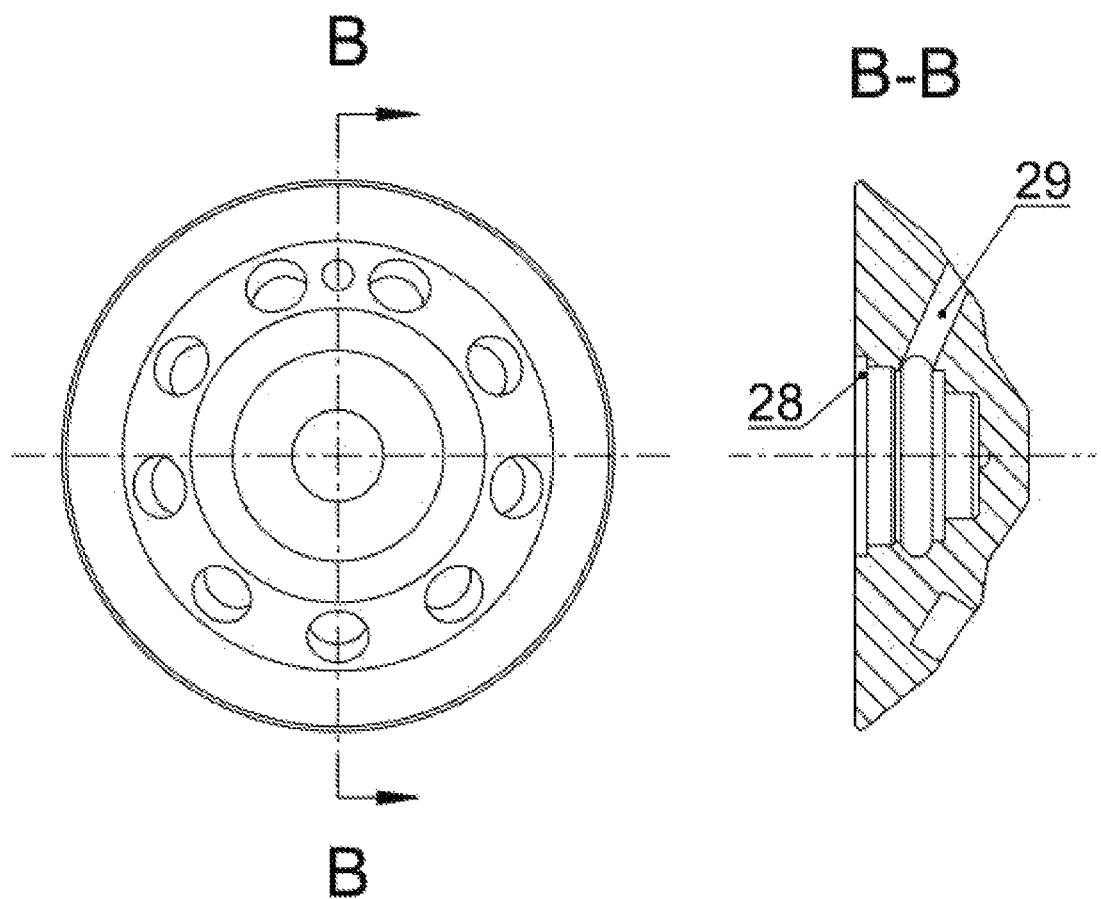
FIG. 7 is a schematic view showing a structure of an upper roller cone body of the present invention.
Figure 8:
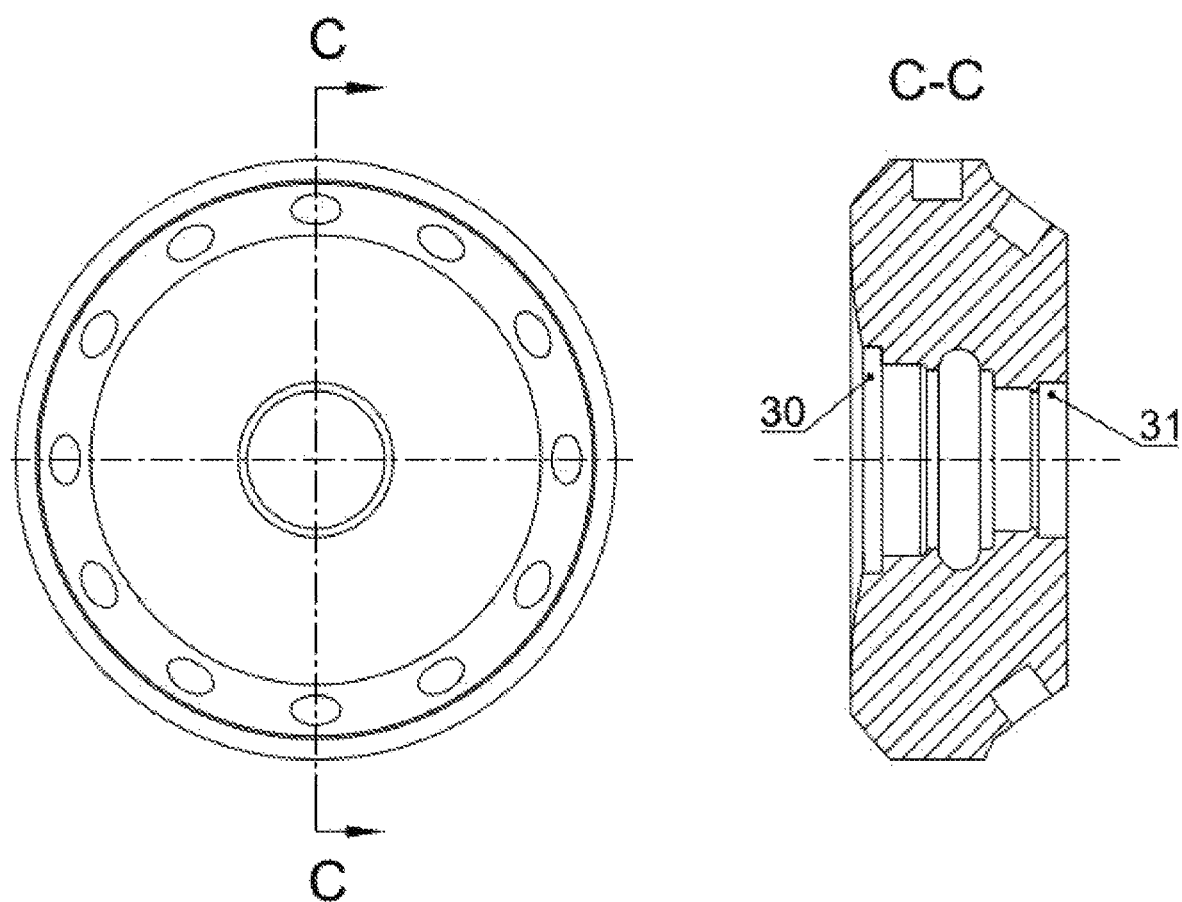
FIG. 8 is a schematic view showing a structure of a lower roller cone body of the present invention.
Figure 9:
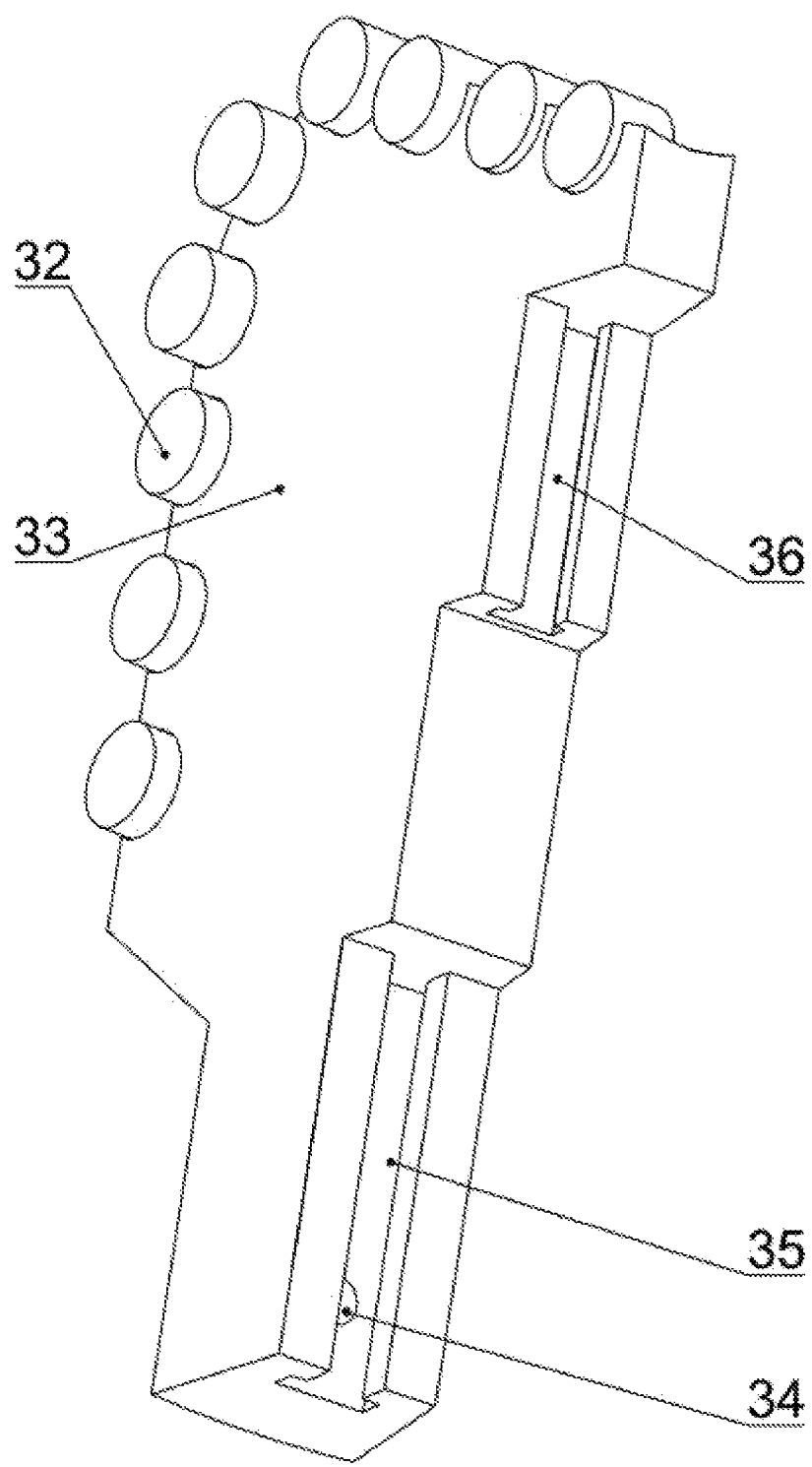
FIG. 9 is a schematic view showing a structure of a PDC bit module of the present invention.
Figure 10:
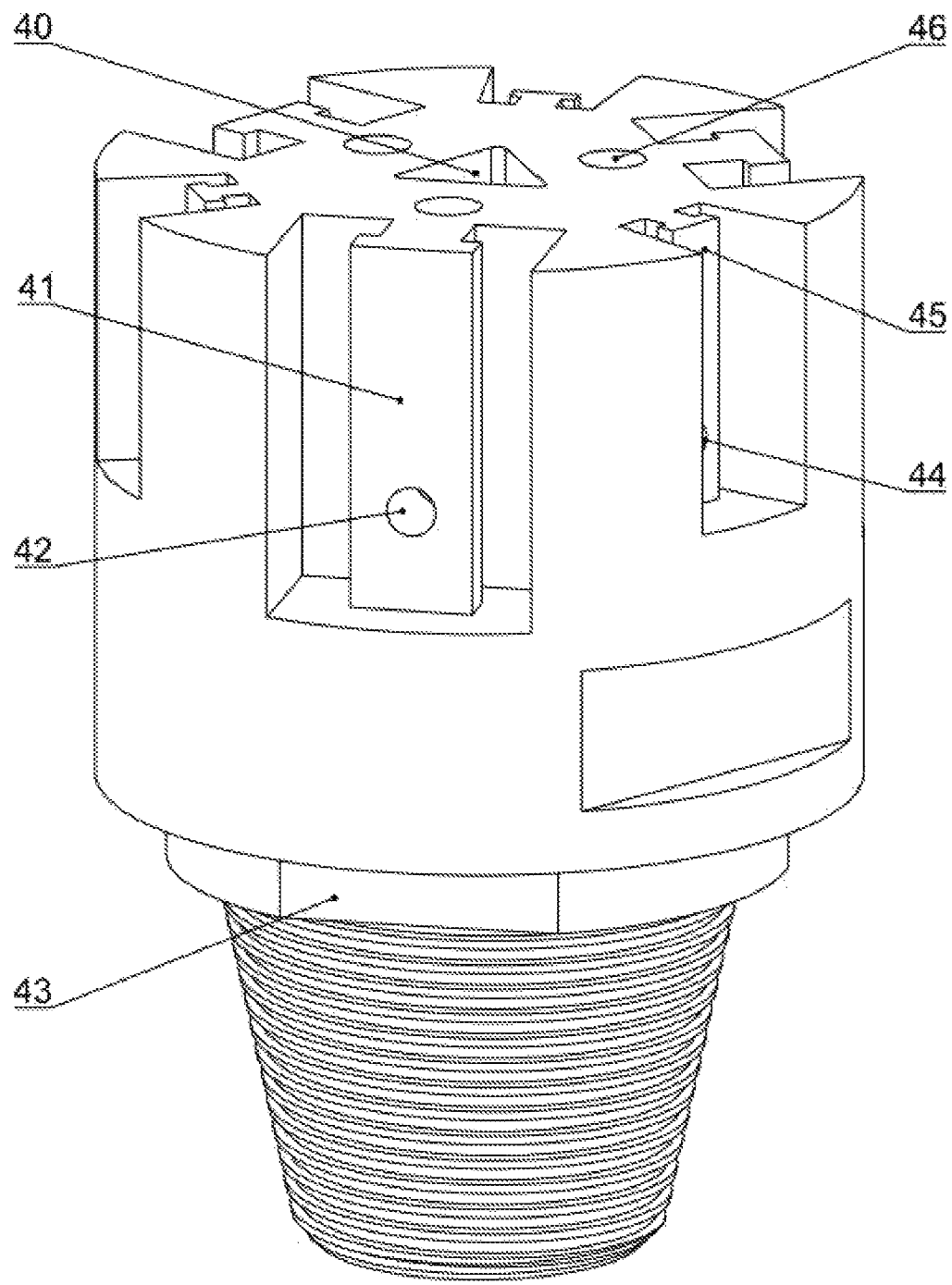
FIG. 10 is a schematic view showing a structure of a composite drill bit main body in the present invention.
Figure 11:
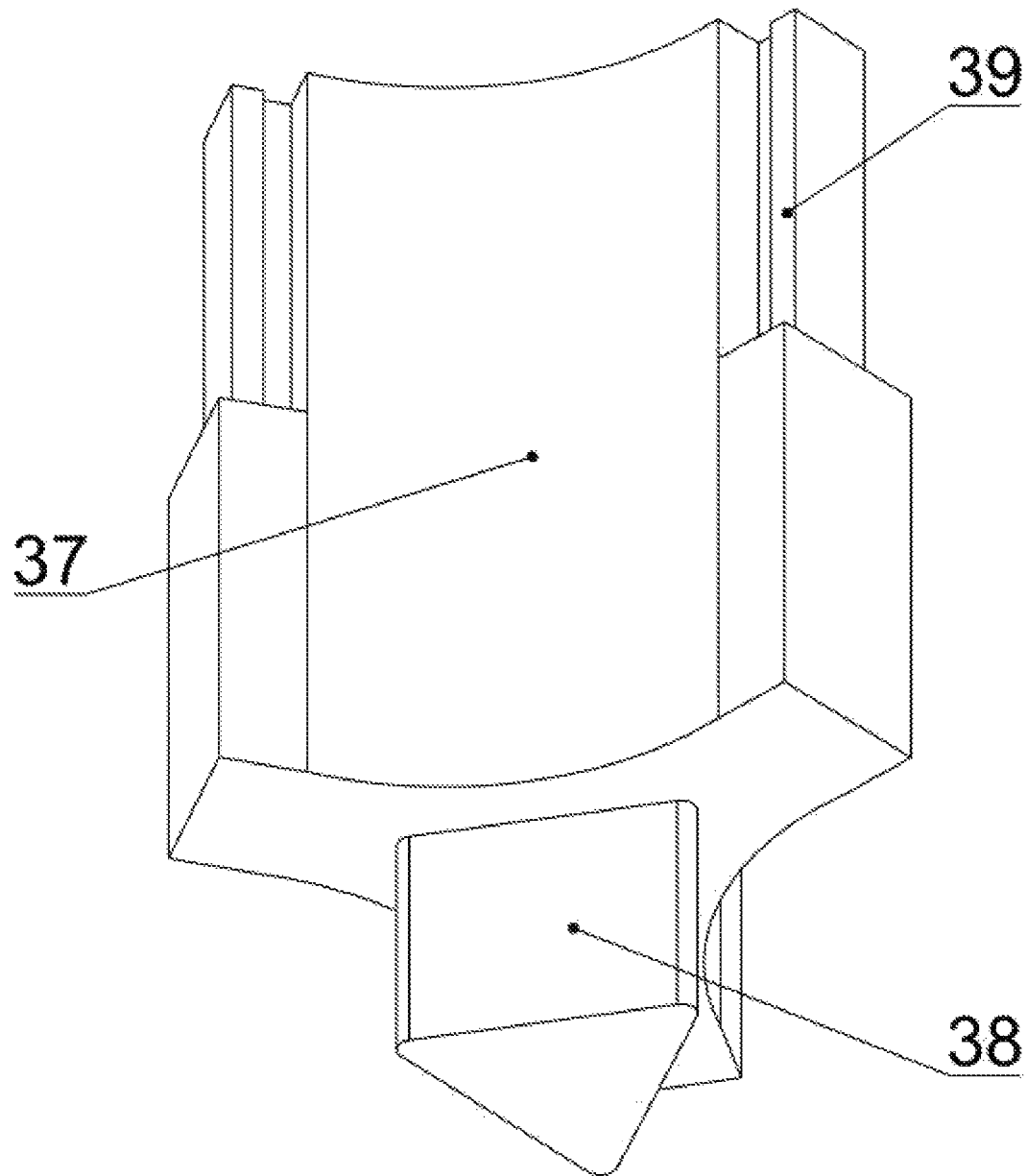
FIG. 11 is a schematic view showing a structure of a cutter blade chuck in the present invention.
Figure 12:
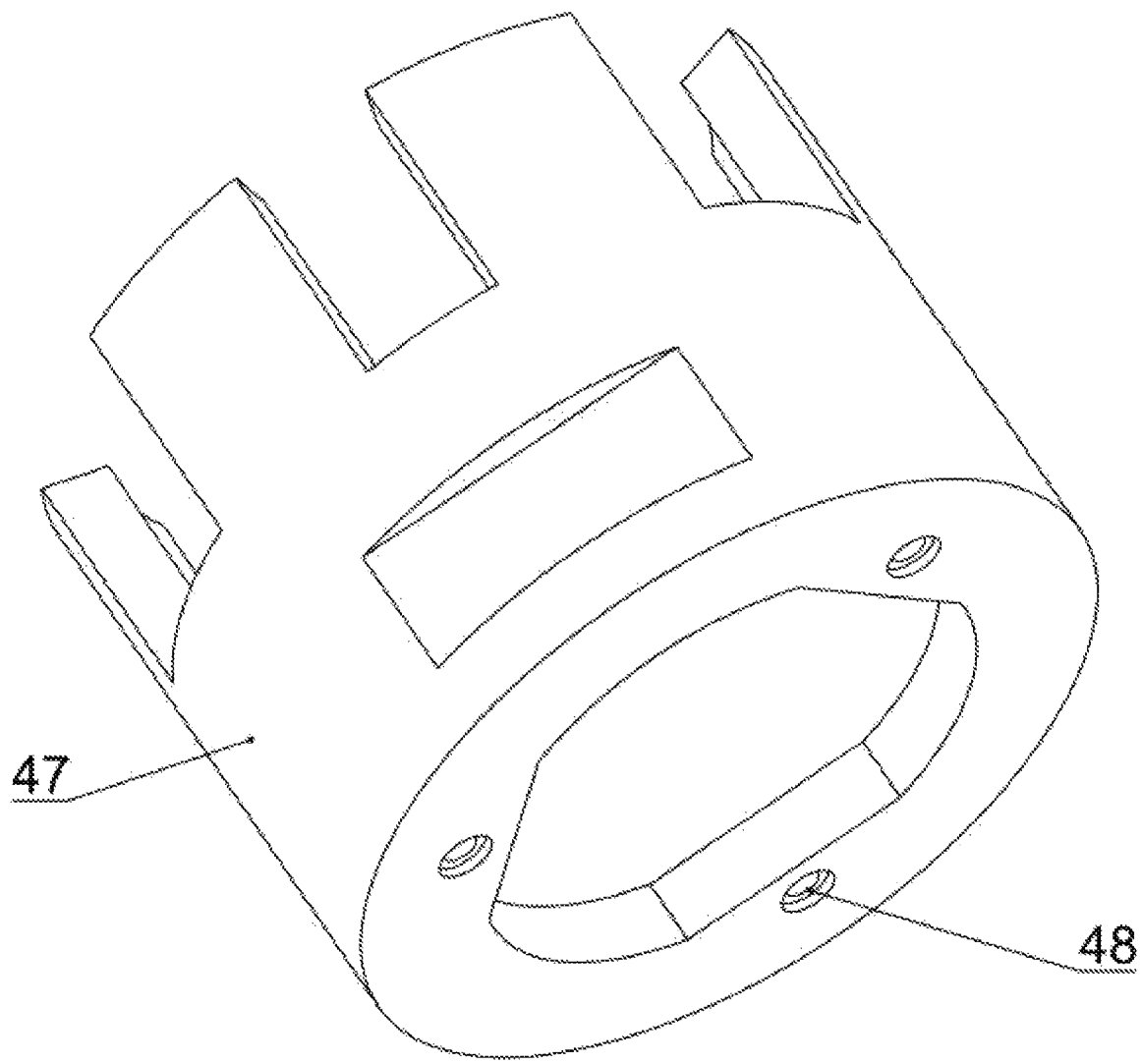
FIG. 12 is a schematic view showing a structure of a reinforcing sleeve in the present invention.

In the figures: 1. nozzle; 2. first hexagon socket head bolt; 3. first plug; 4. first threaded hole; 5. second plug; 6. composite drill bit main body; 7. second hexagon socket head bolt; 8. third plug; 9. tooth; 10. lower roller cone body; 11. upper roller cone body; 12. first steel ball; 13. first rectangular seal ring; 14. first plug pin; 15. palm; 16. oil storage compensation pressure balance system; 17. first countersunk hole; 18. first T-slot; 19. positioning sleeve; 20. second rectangular sealing ring; 21. second steel ball; 22. second plug pin; 23. first palm axle neck oil guiding hole; 24. first plug pin hole; 25. palm oil guiding hole; 26. oil injection hole; 27. second palm axle neck oil guiding hole; 28. bottom inner ring of the upper roller cone body; 29. second plug pin hole; 30. bottom inner ring of the lower roller cone body; 31. top inner ring of the lower roller cone body; 32. PDC tooth; 33. cutter blade; 34. second countersunk hole; 35. second T-slot; 36. second T-slot c; 37. cutter blade chuck; 38. triangular base; 39. first T-shaped table; 40. cutter blade chuck mounting hole; 41. second T-shaped table; 42. second threaded hole; 43. reinforcing sleeve mounting step; 44. third threaded hole; 45. third T-shaped table; 46. mud outlet; 47. reinforcing sleeve; 48. third countersunk hole.

DETAILED DESCRIPTION OF THE EMBODIMENTS

The present invention will be further described in detail below along with the drawings.

Referring to the drawings, a split roller cone and PDC composite drill bit includes a PDC bit module, a split roller cone bit module, and a drill bit body module. The PDC bit module includes the PDC tooth 32, and the cutter blade 33, the PDC tooth 32 is arranged on a tooth arranging surface of the cutter blade 33, and the cutter blade 33 is provided with the second countersunk hole 34, the second T-slot 35, and the third T-slot 36. The split roller cone bit module includes the tooth 9, the lower roller cone body 10, the upper roller cone body 11, the first steel ball 12, the first rectangular seal 13, the first plug pin 14, the palm 15, the oil storage compensation pressure balance system 16, the positioning sleeve 19, the second rectangular seal 20, the second steel ball 21, and the second plug pin 22. The palm 15 is provided with the first countersunk hole 17, the first T-slot 18, the first palm axle neck oil guiding hole 23, first plug pin hole 24, the palm oil guiding hole 25, oil injection hole 26, and the second palm axle neck oil guiding hole 27, the upper roller cone body 11 is provided with the second plug pin hole 29, the teeth 9 are mounted on the lower roller cone body 10 and the upper roller cone body 11, and the oil storage compensation pressure balance system 16 is installed at a lower end of a back of the palm 15. When installing the split roller cone bit module, firstly, the first rectangular sealing ring 13 is installed at the bottom inner ring 30 of the lower roller cone body, the second rectangular sealing ring 20 and the positioning sleeve 19 are sequentially installed on the top inner ring 31 of the lower roller cone body, and the second rectangular sealing ring 20 is mounted on the bottom inner ring 28 of the upper roller cone body; secondly, the lower roller cone body 10 and the upper roller cone body 11 are sequentially inserted into an axle neck of the palm 15, the first steel ball 12 is placed in the first plug pin hole 24, and the second steel ball 21 is placed in the second plug pin hole 29; finally, the first plug pin 14 is installed in the first plug pin hole 24, the second plug pin 22 is installed in the second plug pin hole 29, a lubricating oil is added through the oil injection hole 26, and the oil injection hole 26 is closed by a wire plug. The drill bit body module includes the nozzle 1, the composite drill bit main body 6, the cutter blade chuck 37, and the reinforcing sleeve 47. The composite drill bit main body 6 is provided with the first threaded hole 4, the cutter blade chuck mounting hole 40, the first T-shaped table 41, the reinforcing sleeve mounting step 43, the third T-shaped table 45, and the mud outlet 46, wherein the second T-shaped table 41 is provided with the second threaded hole 42, and the third T-shaped table 45 is provided with the third threaded hole 44, the cutter blade chuck 37 is provided with the triangular base 38 and the first T-shaped table 39, the reinforcing sleeve 47 is provided with the third countersunk hole 48, the nozzle 1 is mounted on the mud outlet 46, the cutter blade chuck 37 is mounted in the cutter blade chuck mounting hole 40, and the first plug 5 is installed in the first threaded hole 4. When assembling the split roller cone and PDC composite drill bit, firstly, the first T-slot 18 is installed into the second T-shaped table 41, and the second T-slot 35 is installed into the third T-shaped table 45, so as to realize the circumferential positioning of the split roller cone bit module and the PDC bit module; secondly, the palm 15 and the cutter blade 33 are fixed on the composite drill bit main body 6 by using the first hexagon socket head bolt 2 and the first hexagon socket head bolt 7, respectively, so as to realize the axial positioning of the split roller cone bit module and the PDC bit module; finally the first plug 3 and the first plug 8 are inserted into the first countersunk hole 17 and the second countersunk hole 34, respectively.

In the above solution, the first plug pin 14 is in an interference fit with the first plug pin hole 24, and the second plug pin 22 is in an interference fit with the second plug pin hole 29. The first palm axle neck oil guiding hole 23, the first plug pin hole 24, the palm oil guiding hole 25, the oil injection hole 26, the second palm axle neck oil guiding hole 27, and the axle neck channel of the palm 15 form an oil guiding passage, thus forming a good lubrication environment.

The axle neck of the palm 15 and the reinforcing sleeve 47 of the above solution are subjected to a strengthening treatment, and have high strength and good impact toughness.

The first rectangular sealing ring 13 and the first rectangular sealing ring 20 in the above solution are both metal sealing rings, and surfaces of the sealing rings are strengthened, and the wear resistance of the sealing ring is good.

The cutter blade 33 and the composite drill bit main body 6 in the above solution are both steel bodies, and the blade wing 33 is made of a material with a higher strength than that of a material of the composite drill bit main body 6.

For the split roller cone and PDC composite drill bit, the blade wings 33 of different specifications and the cutter blade chucks 37 of different specifications are simultaneously replaced to change the working outer diameter of the drill bit. Moreover, the reinforcing sleeve 47 is sleeved on the reinforcing sleeve mounting step on the composite drill bit main body 6 and fixed on the composite drill bit main body 6 by screws, and the third countersunk hole 48 is blocked by the second plug, thereby improving the force state of the cutter blade 33.

The split roller cone and PDC composite drill bit includes the PDC bit module, the split roller cone bit module, and the drill bit body module. The split roller cone bit module has a split structure, and the palm 15 is connected to the lower roller cone body 10 and the upper roller cone body 11 by the axle neck of the palm arranged at the lower end of the palm. During the operation, the lower roller cone body 10 and the upper roller cone body 11 will not only revolve with the drill bit, but also rotate around the axial necks of the palms, respectively, thereby achieving the task of scraping and breaking rocks. The tooth scraping efficiencies of the small-end ring gear and the middle ring gear are improved, increasing the rock breaking efficiency of the drill bit. The split roller cone bit module, the PDC bit module, and the drill bit body module can be mass-produced as standard parts of the drill bit, facilitating the reductions of production cycle and manufacturing cost. The split roller cone bit module and the PDC bit module can be quickly assembled and disassembled with the drill bit body module, suitable for an on-site production operation. Moreover, different sizes of PDC bit modules are assembled with the drill bit body module, which can achieve different well sizes.

What is claimed is:

1. A split roller cone and polycrystalline diamond compact (PDC) composite drill bit, comprising:
    a PDC bit module, a split roller cone bit module, and a drill bit body module;
    wherein the PDC bit module comprises at least one PDC tooth and a cutter blade;
    wherein the at least one PDC tooth is arranged on a PDC tooth arranging surface of the cutter blade, and the cutter blade comprises a second countersunk hole, a second T-slot, and a third T-slot;
    wherein the split roller cone bit module comprises a plurality of roller cone teeth, a lower roller cone body, an upper roller cone body, a first steel ball, a first rectangular sealing ring, a first plug pin, a palm, an oil storage compensation pressure balance system, a positioning sleeve, a second rectangular sealing ring, a second steel ball, and a second plug pin;
    wherein the palm comprises a first countersunk hole, a first T-slot, a first palm axle neck oil guiding hole, a first plug pin hole, a palm oil guiding hole, an oil injection hole, and a second palm axle neck oil guiding hole;
    wherein the upper roller cone body comprises a second plug pin hole;
    wherein the plurality of roller cone teeth are mounted on the lower roller cone body and the upper roller cone body;
    wherein the oil storage compensation pressure balance system is mounted on a lower end of a back of the palm; and wherein the first rectangular sealing ring is installed at a bottom inner ring of the lower roller cone body; and wherein the second rectangular sealing ring and the positioning sleeve are configured to mount on a top inner ring of the lower roller cone body, and the second rectangular sealing ring is configured to mount on a bottom inner ring of the upper roller cone body;

wherein the lower roller cone body and the upper roller cone body are positioned within an axle neck of the palm; and wherein the first steel ball is positioned within the first plug pin hole, and second the steel ball is positioned within the second plug pin hole; and wherein the first plug pin is installed in the first plug pin hole and the second plug pin is installed in the second plug pin hole;

wherein the oil injection hole is configured to receive a lubricating oil and further comprising a wire plug configured to close the oil injection hole;

wherein the drill bit body module comprises a nozzle, a composite drill bit main body, a cutter blade chuck, and a reinforcing sleeve;

wherein the composite drill bit main body comprises a first threaded hole, a cutter blade chuck mounting hole, a second T-shaped table, a reinforcing sleeve mounting step, a third T-shaped table, and a mud outlet;

wherein the second T-shaped table comprises a second threaded hole and the third T-shaped table comprises a third threaded hole;

wherein the cutter blade chuck comprises a triangular base and a first T-shaped table;

wherein the reinforcing sleeve comprises a third countersunk hole;

wherein the nozzle is mounted on the mud outlet;

wherein the cutter blade chuck is mounted in the cutter blade chuck mounting hole; and the second plug is mounted in the first threaded hole;

wherein the split roller cone bit module and the PDC bit module are configured to be secured in the circumferential positions by the first T-slot mounted in the second T-shaped table and the second T-slot mounted in the third T-shaped table;

wherein the split roller cone bit module and the PDC bit module are configured to be axially secured by a first hexagon socket head bolt fixedly attaching the palm to the composite drill bit main body and a second hexagon socket head bolt fixedly attaching the cutter blade to the composite drill bit main body; and wherein the first plug is positioned within the first countersunk hole and a third plug is positioned within the second countersunk hole.

2. The split roller cone and PDC composite drill bit according to claim 1, wherein the first plug pin is in an interference fit with the first plug pin hole, the first plug pin is in an interference fit with the second plug pin hole, the first palm axle neck oil guiding hole, the first plug pin hole, the palm oil guiding hole, the oil injection hole, the second palm axle neck oil guiding hole, and an axle neck channel of the palm form an oil guiding passage, thereby forming a lubrication environment.

3. The split roller cone and PDC composite drill bit according to claim 1, wherein the first rectangular sealing ring and the second rectangular sealing ring are both metal sealing rings.

4. The split roller cone and PDC composite drill bit according to claim 1, wherein the cutter blade and the composite drill bit main body are both steel bodies.

5. The split roller cone and PDC composite drill bit according to claim 1, prepared by a process comprising the steps of:

wherein the cutter blade and the cutter blade chuck are replaced to change a working outer diameter of the drill bit, the reinforcing sleeve is sleeved into the reinforcing sleeve mounting step on the composite drill bit main body and fixed on the composite drill bit main body by screws, and the third countersunk hole is blocked with the second plug, thereby improving a force state of the cutter blade.

* * * * *